INVENTORS
JACQUES CHOLET, JEAN PIERRE FAIL,
GERARD GRAU, PIERRE MAGNEVILLE

BY Craig & Antonelli
ATTORNEYS

INVENTORS
JACQUES CHOLET
JEAN PIERRE FAIL
GERARD GRAU
PIERRE MAGNEVILLE
BY
Craig & Antonelli
ATTORNEYS

INVENTORS
JACQUES CHOLET, JEAN PIERRE FAIL,
GERARD GRAU, PIERRE MAGNEVILLE

BY Craig & Antonelli
ATTORNEYS

INVENTORS
JACQUES CHOLET
JEAN PIERRE FAIL
GERARD GRAU, PIERRE MAGNEVILLE

BY Craig R Antonelli
ATTORNEYS

INVENTORS
JACQUES CHOLET
JEAN PIERRE FAIL
GERARD GRAU
PIERRE MAGNEVILLE

BY Craig & Antonelli
ATTORNEYS

INVENTORS
JACQUES CHOLET, JEAN PIERRE FAIL,
GERARD GRAU, PIERRE MAGNEVILLE

BY Craig & Antonelli
ATTORNEYS

INVENTORS
JACQUES CHOLET, JEAN PIERRE FAIL,
GERARD GRAU, PIERRE MAGNEVILLE

Craig & Antonelli
ATTORNEYS

May 20, 1969 J. CHOLET ET AL 3,444,953

DEVICE TO AVOID THE PULSATION OF THE GAS BUBBLES GENERATED BY UNDERWATER EXPLOSIONS

Filed Sept. 15, 1967

Sheet 8 of 8

INVENTORS
JACQUES CHOLET, JEAN PIERRE FAIL, GERARD GIRAU, PIERRE MAGNEVILLE

BY Craig & Antonelli
ATTORNEYS

United States Patent Office 3,444,953

Patented May 20, 1969

3,444,953

DEVICE TO AVOID THE PULSATION OF THE GAS BUBBLES GENERATED BY UNDERWATER EXPLOSIONS

Jacques Cholet, Rueil Malmaison, Jean Pierre Fail and Gerard Grau, Paris, and Pierre Magneville, Vernouillet, France, assignors to Institut Francais du Petrole des Carburants et Lubrifiants Filed Sept. 15, 1967, Ser. No. 667,998

Claims priority, application France, Sept. 16, 1966, 76,741; Oct. 4, 1966, 78,782; Nov. 23, 1966, 84,742; Jan. 13, 1967, 91,173

Int. Cl. G10k *10/00*

U.S. Cl. 181—.5 11 Claims

ABSTRACT OF THE DISCLOSURE

A device to avoid the pulsations of the gas bubbles generated by underwater explosions which comprises a container provided with a mouth-piece having an internal pipe for feeding from a surface installation the explosives to the container; the container itself includes at least one resilient closing and opening element which provides in effect an intermittent conection of the interior of the container with the surrounding liquid medium by deformation under the action of the pressure rise within the container as a result of the explosion. The container may be of substantially spherical shape, and the opening and closing element may be constituted by a tubular extension of the sphere.

It is known that the detonation of an explosive charge in the water, at a great depth or close to the water bottom, generates a gas bubble. This bubble, immediately after the explosion or at the beginning of its rise towards the water surface is subjected, as a result of its resiliency, to pulsatory phenomena similar to those undergone by a spring which is subjected to a sudden thrust. These pulsatory phenomena generate in turn troublesome disturbances in the seismic recordings of the reflected waves.

A known means to substantially attenuate the pulsations of this bubble consists in using a metallic sphere which is provided with a plurality of holes regularly distributed on its wall and in which the explosion is carried out, this sphere being made of a material which can withstand the explosion. It is however difficult to build such spheres having a sufficient mechanical strength to withstand numerous repeated explosions.

The present invention has for an object a new device, easier to build and of greater efficiency for considerably attenuating the pulsation of the gas bubble generated at the instant of explosion of a charge in the water.

This device is intended to be connected to the immersed end of a device for loading and firing explosive charges, such as for example the one described in the Ser. No. 426,834, filed Jan. 21, 1965, now Patent No. 3,368,641, wherein this new device would replace the perforated sphere, the explosive charge in its position at the instant of the explosion being located substantially in the center of the device according to the invention.

This device essentially consist of an immersed container which is connected with the immersed end of the loading device through a mouthpiece provided with an internal pipe connecting the interior of the container with the loading device. The container is provided with means for intermittent closing, made of a resilient material and fastened to said container.

The container is provided with an opening-closing device made of a resilient material and providing intermittent connection of the interior of the container with the surrounding liquid medium as a result of its deformation under the action of the pressure rise inside the container, due to the explosion.

The invention will be described more in detail with reference to the accompanying drawings wherein.

Figure 4:
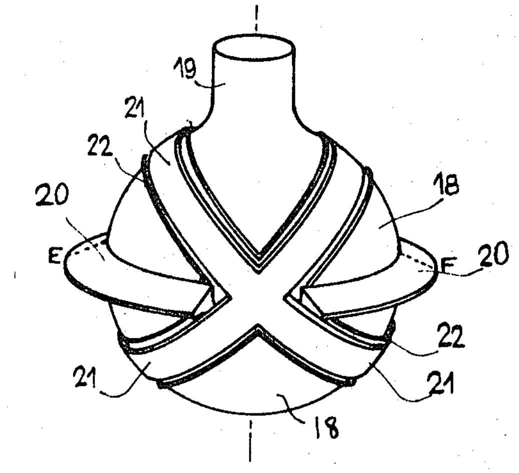
Figure 4A:
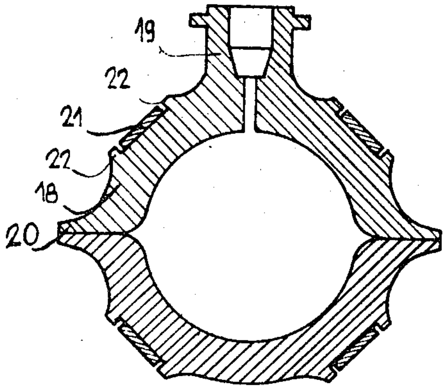
Figure 4B:
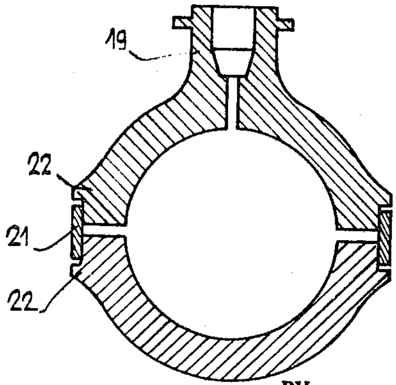
Figure 5:
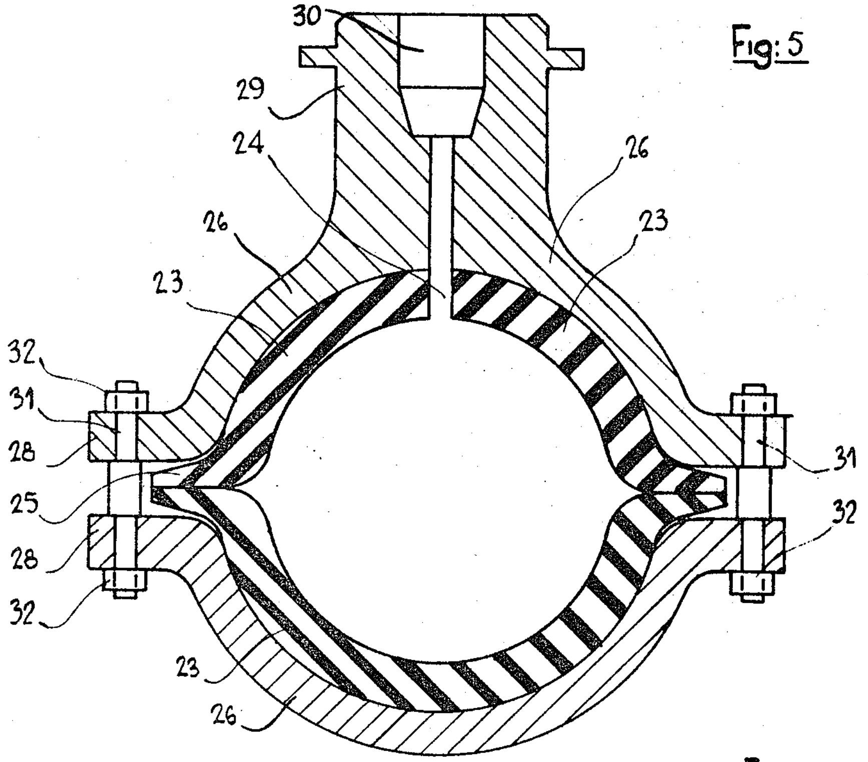
Figure 5A:
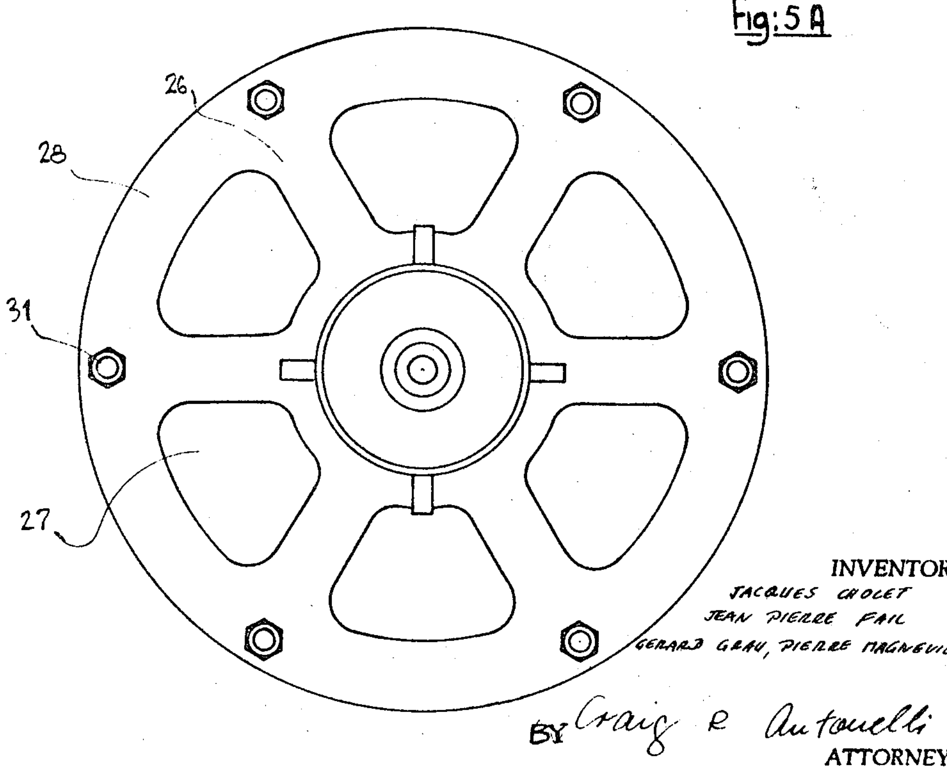
Figure 6:
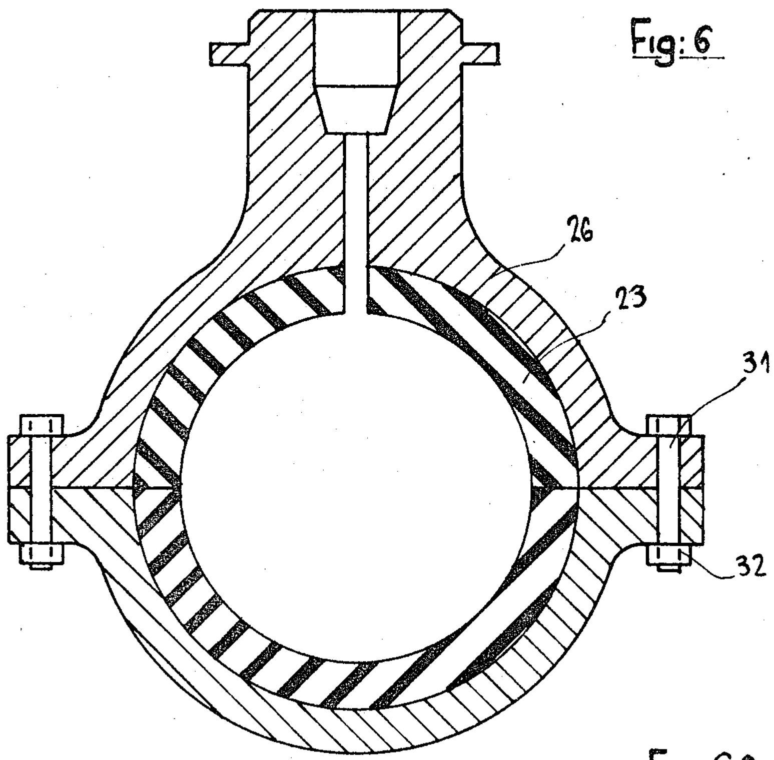
Figure 6A:
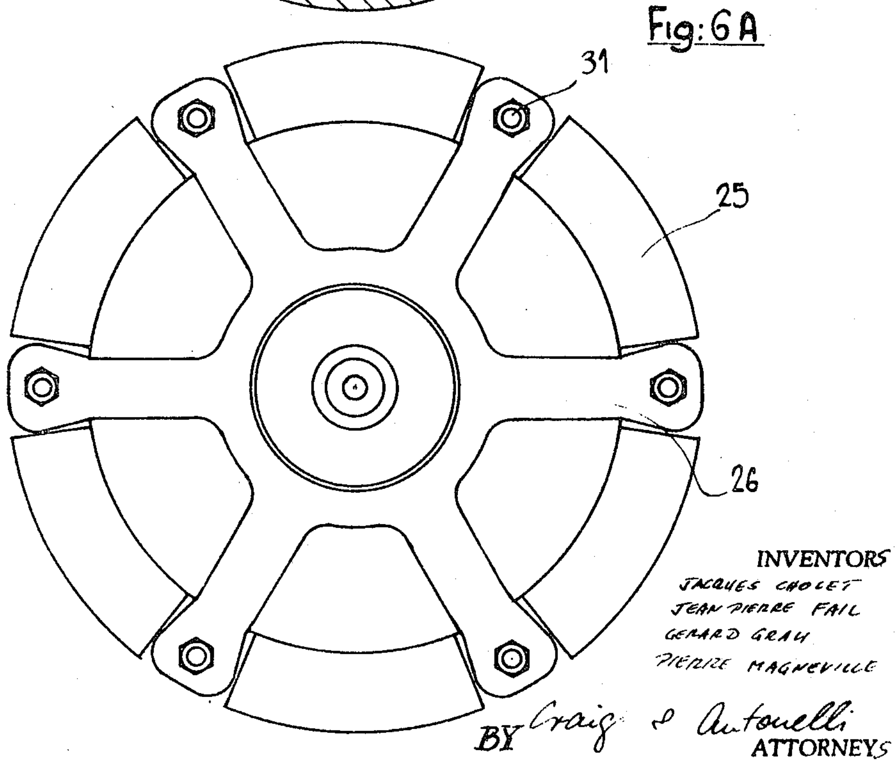
Figure 7:
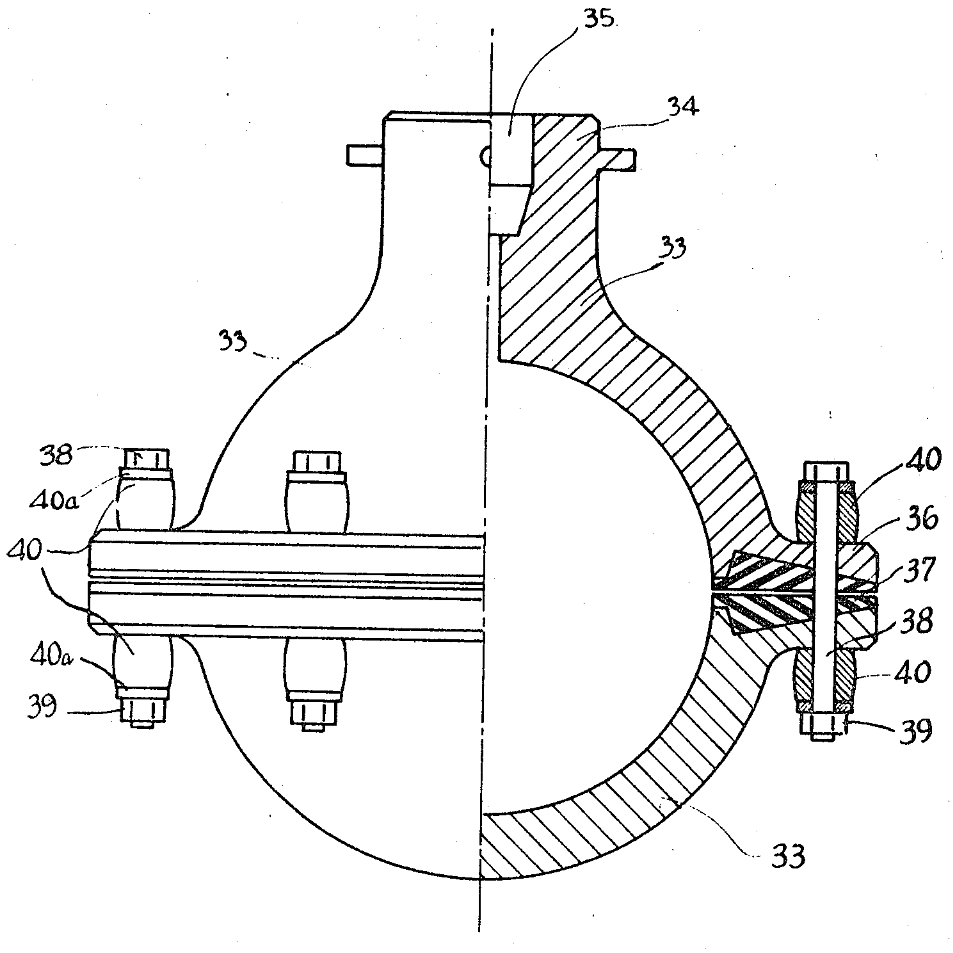
Figure 8:
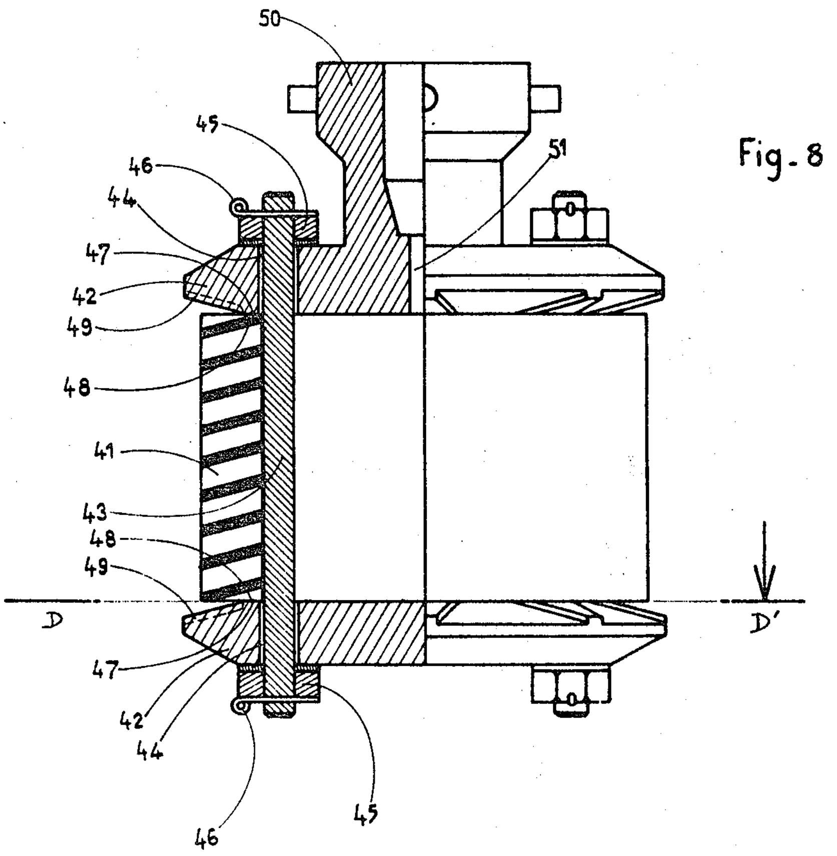
Figure 9:
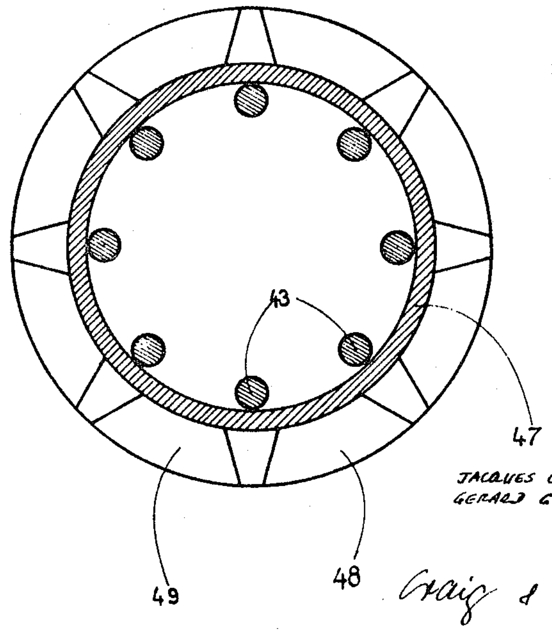
Figure 10:
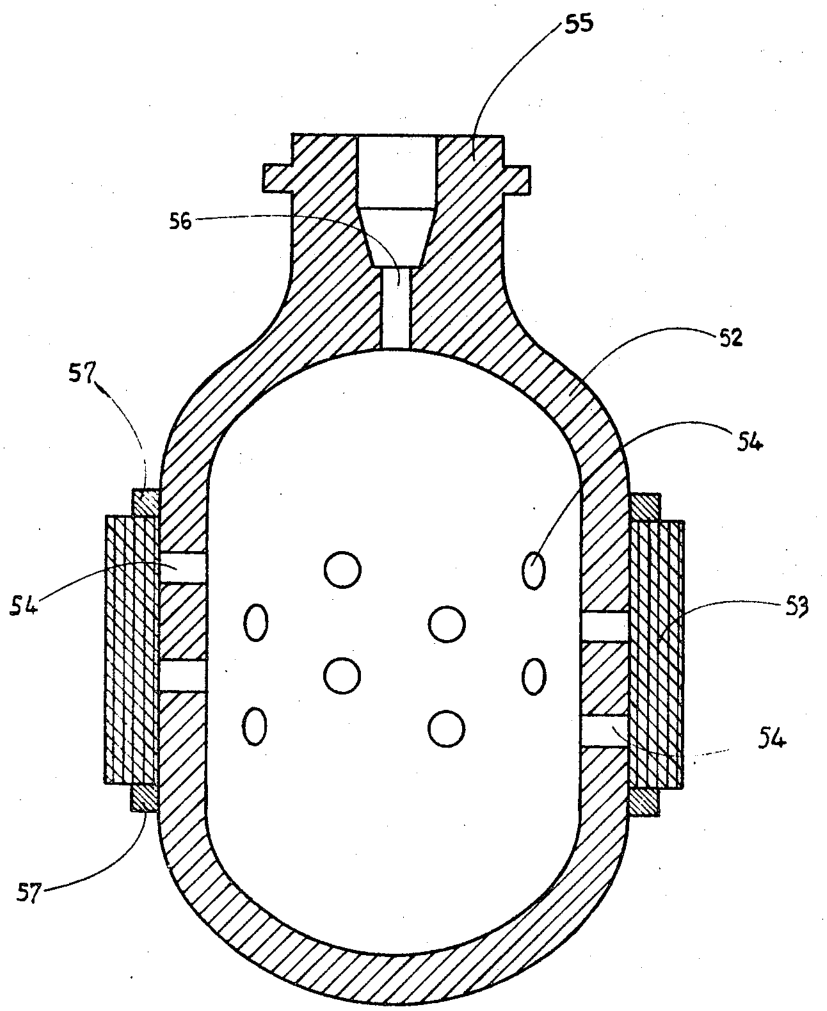

FIG. 4 diagrammatically shows an overall view of a third embodiment of the device according to the invention;

FIGS. 4*a* and 4*b* are views in partial longitudinal section respectively taken along a first plane passing through the longitudinal axis and the points E and F and along a second plane at right angles to the first one;

FIG. 5 illustrates a longitudinal sectional view of a fourth embodiment of the device according to the invention;

FIG. 5*a* is a view from above the device of FIG. 5;

FIG. 6 illustrates a longitudinal sectional view of a fifth embodiment of the device according to the invention;

FIG. 6*a* is a view from above the device of FIG. 6;

FIG. 7 is a longitudinal sectional view of a sixth embodiment of the device according to the invention;

FIG. 8 illustrates a partially sectional view of a seventh embodiment of the device according to the invention;

FIG. 9 shows a section taken along DD′ of the embodiment of FIG. 8;

FIG. 10 is a sectional view of an eighth embodiment of the device according to the invention.

Figure 1:
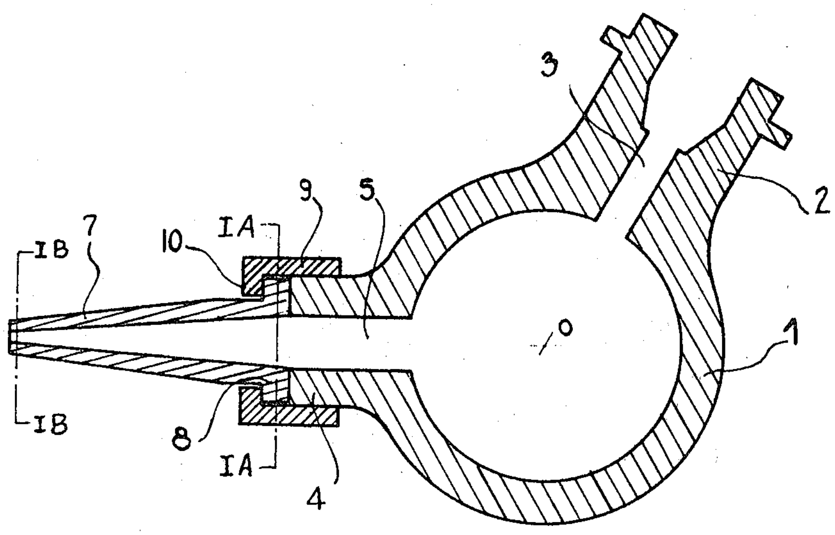
FIG. 1 illustrates a longitudinal section of a first embodiment of the device according to the invention.

According to a first embodiment illustrated by FIG. 1, the device includes essentially an immersed sphere having a solid wall made of a material which can withstand the explosion. This sphere is provided with a mouthpiece 2 for connection with a non-illustrated loading device.

The mouthpiece 2 includes an internal pipe 3, connecting the interior of the sphere with the loading device.

The sphere 1 is furthermore provided with a tubular extension 4, including an internal longitudinal pipe 5. This extension is connected with a likewise tubular element having the shape of a "duck-bill" this "duck-bill" exhibits an internally circular section adapted to the section of the tubular extension 4, at the level of its neck 8 connected with this extension.

This circular section becómes progressively elliptical or substantially elliptical as it comes closer to the extremity of the bill opposite to the neck 8, the "duck-bill" having at this extremity a very flattened and widened shape, the internal section of the element 7 increasing progressively from the neck. The thickness of the wall of the "duck-bill" 7 will advantageously decrease from its connecting extremity towards the opposite extremity. The connection of the element 7 with the tubular extension 4 of the sphere is effected for example by means of a ring 9 adapted to be screwed at one extremity on the tubular extension 4 and is provided at the opposite extremity with a flange 10 coming into abutment against the neck 8 of the element 7.

At the instant of the explosion of the charge which is substantially located at 0, the so-generated gas bubble is first subjected to an expanding motion and expells outwardly the water which is contained in the sphere and the duck-bill 7.

Figures 1A, 1B, 2:
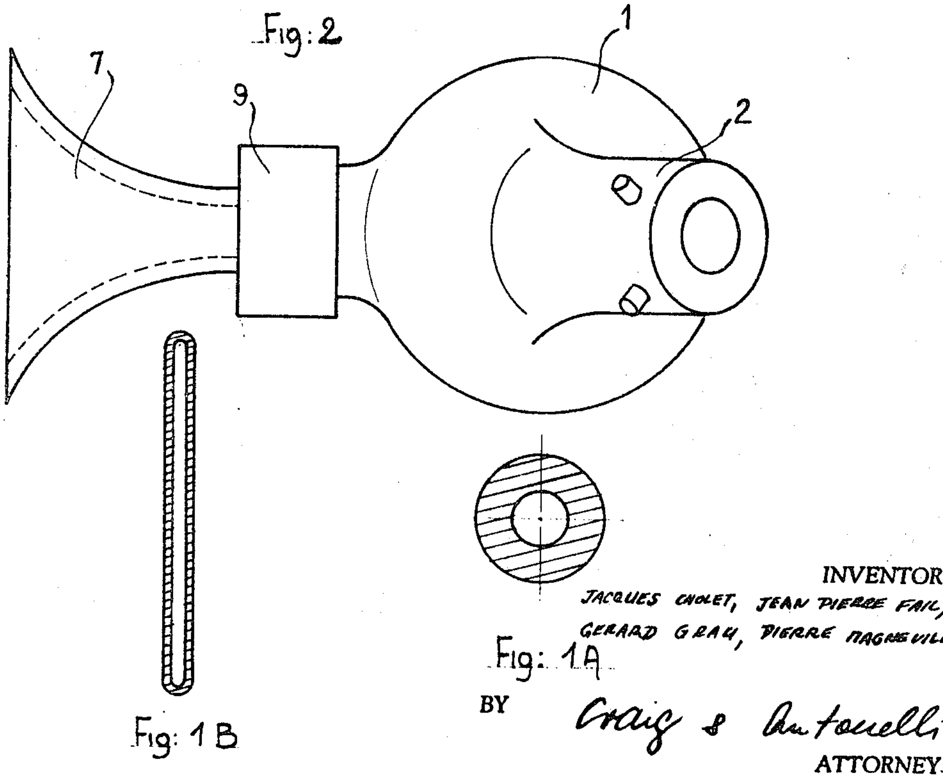
FIG. 1A shows a transverse section taken along IA—IA of FIG. 1.
FIG. 1B shows a transverse section taken along IB—IB of FIG. 1.
FIG. 2 illustrates a view from above the device of FIG. 1.

During its compressing motion following the expansion its volume decreases and the surrounding water tends to be drawn up through the bill 7. At this instant the flattened lips of the bill 7 (FIG. 1B) are closed back, thus preventing the admission of water and thereby stopping the pulsations of the gas bubble.

The tubular element 7 of flexible material also results in stabilizing the displacement of the device during the sailing of the ship which tows this device.

According to a second embodiment of the device of the invention, this device includes a container provided with apertures at two opposite extremities, the closure of each of said apertures being normally effected by means of a cover which is partially fastened to the container and made of a resilient material allowing a partial displacement of this cover, so as to intermittently provide a connection of the interior of the container with the surrounding body of water.

Figure 3:
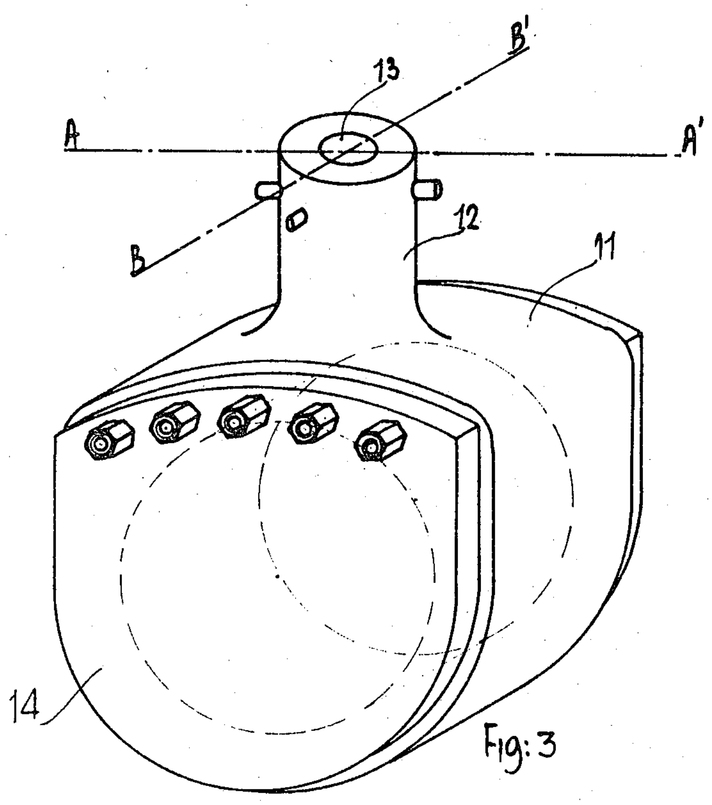
FIG. 3 is an overall view of a second embodiment of the device according to the invention.
Figure 3A:
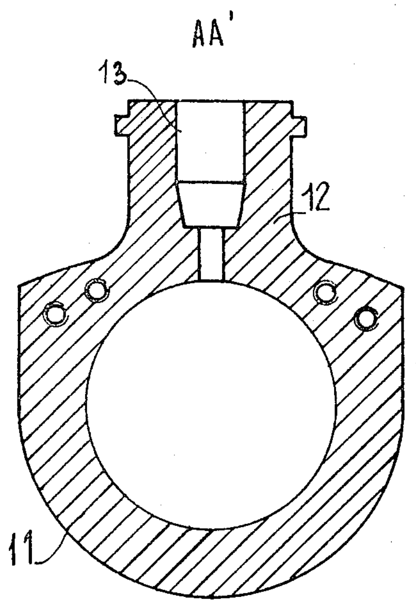
FIG. 3A is a sectional view taken along AA′ of the device of FIG. 3.
Figure 3B:
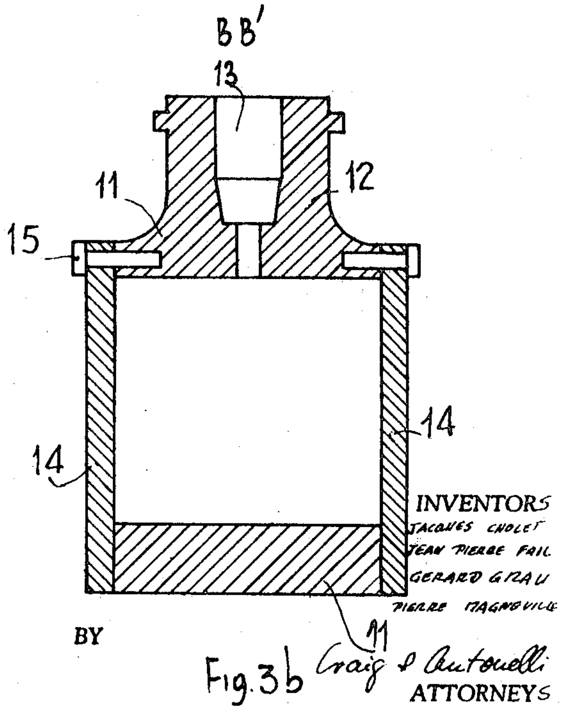
FIG. 3B is a sectional view taken along BB′ of the device of FIG. 3.

A device of this type, such as illustrated by FIGS. 3, 3*a* and 3*b*, includes a container 11 having substantially the shape of a cylinder which is open at both extremities. The container is provided on its external wall with a mouthpiece 12 including a pipe 13 opening out in the internal space of the container.

This mouthpiece is devised for the connection of the container with means for loading this container with explosives, each aperture of the container being closed by a cover 14 fastened on one side to the container 11, preferably on the side of this cover located close to the mouthpiece, for example by means of tie bolts 15 (FIG. 3*b*).

The container and its covers are advantageously made of a material which is acoustically transparent and can withstand the explosion.

A rigid material will preferably be used for the container and a slightly resilient material for the covers. Alternatively a resilient material in which a discontinuous metallic armouring is embedded may be used for the covers.

The operation of the above-described device is as follows.

When the explosion is carried out substantially in the center of the container, a gas bubble is generated, the volume of which increases thereby pushing back the covers 14 and expelling the water enclosed in the container.

After the bubble has reached its maximal diameter it should normally be recompressed by the action of the water. As the covers however are then applied, as a result of the suction, against the apertures of the container, the recompression of the bubble which is enclosed therein is prevented and the pulsations are stopped.

According to a third embodiment of the device of the invention, illustrated by FIGS. 4, 4*a* and 4*b*, the container is constituted by two hemispherical elements 18 made of a strong resilient material, one of these elements being provided with a mouthpiece 19 for its connection to the end of a pipe for loading explosives (not shown). Each element 18 is provided on its circular diametral base with an annular flange 20 also made of a strong resilient material and projecting beyond this element over a width which is, for example of the order of about ten centimeters, the thickness of the flange 20 being relatively small and decreasing outwardly.

The elements 18 are so joined that their respective juxtaposed flanges constitute annular lips. These annular lips are interrupted at some places so as to allow the passage of binding rigid strips or rings for the connection of the elements 18. These binding strips 21 are held in position on both sides by annular ribs 22, which may for example be cast in one piece with the elements 18.

At the instant of the explosion and of the expansion of the gas bubble, the water located inside the so-formed recess is expelled through the annular lips 20. However at the instant of the contraction of this bubble, the lips are closed, thereby preventing any inlet of the water and stopping the pulsatory motions of said bubble.

According to a fourth embodiment of the invention, illustrated by FIGS. 5 and 5*a*, the container is constituted by two hemispherical elements made of a strong and resilient material one of them having an aperture 24 at its top, these elements being provided on their diametral circular base with an external annular flange 25 similar to the flange 20 of FIG. 4.

With these hemispherical elements 23 are associated hemispherical rigid caps 26 provided with holes 27 so as to be lighter.

The caps 26 externally cover the elements 23 and are provided on their diametral circular edge with an external annular flange 28 projecting beyond the flange 25. One of these caps 26 is provided with a mouthpiece 29 including an internal pipe 30 in the extension of the aperture 24 of an element 23.

These elements 23 covered by the caps 26 are so assembled that the flanges 25 are superposed thereby forming annular lips. The connection is effected by means of screws 31 and nuts 32 located in some places of the two flanges 28, thereby fixing the latter while providing for a free interval therebetween.

The assembling is carried out outside the annular flanges 25 and provides a free access from the latter to the surrounding body of water.

The operation of this device is the same as that of the device of FIG. 4.

According to a fifth embodiment of the device of the invention, illustrated by FIGS. 6 and 6*a* and constituting a modification of the preceding embodiment, the caps 26 have no continuous flange 28. The annular lips 25 are interrupted by places so as to allow the fixation of the caps 26 together.

The operation of this device is identical to that of the devices of FIGS. 4 and 5.

According to a sixth embodiment of the device of the invention, illustrated by FIG. 7, the container is constituted by two hemispherical elements 33 made of a strong and rigid material, one of which is provided with a mouthpiece made of the same material, including an internal pipe 35.

Each element 33 is provided on its diametral base with an external flange 36 also made of a rigid material and lined with a resilient material 37 on its face which is adjacent to the other element.

The two hemispherical elements 33 are assembled by means of screws 38 and nuts 39 fastening at some places the flanges 36, their resilient faces being adjacent. Between the external faces of the flanges 36 and the screw head on the one side, and the nut on the other side are located rings 40 made of a resilient material and protected by metallic washers **40*a***.

During the explosion of the charge and the expansion of the so-created gas bubble, the two hemispherical elements 33 move apart from each other, thereby compressing the resilient rings 40 and the water escapes from the container. During the period of contraction of the gas bubble, the two elements 33 are brought back together, thereby completely closing the container and stopping the pulsatory movement of said bubble. The resilient faces 37 have for effect to prevent the creation of a disturbing noise at the instant when the elements 33 join each other.

According to a modification of this embodiment, the two elements 33 as well as their flanges are made of a resilient material. In such a case the rings 40 will be on the contrary made of a rigid material, such as for example steel, and at the instant of the explosion the flanges 36 and 37 will move apart from each other within the interval limited by their fastening points so as to let the water escape, and will then close back at the moment of the contraction of the gas bubble.

According to a seventh embodiment which is illustrated by way of ezample by FIGS. 8 and 9, the container includes on the one hand a cylindrical wall 41 made of an elastically deformable material having a high acoustical transparency, such as for example a rubber or a plastic material which may be used in a flexible or semi-flexible form and exhibiting also a good resistance against explosion, and on the other hand two rigid circular walls 42, each covering one open extremity of the cylinder 41. These rigid walls are held in position by means of rods 43 made of a rigid material and located inside the cylinder and in the vicinity of its walls, each end of said rods being respectively connected with each circular wall 42. In order to make the assembling easier, the ends of the rods may for example be fitted into apertures 44 provided in the rigid walls 42 and fastened thereto by means of nuts 45 fixed by pins 46, although any other fastening means may obviously be used.

Each rigid wall 42 is so designed as to provide an annular zone 47 of this wall in continuous contact, during the non-operative periods, with an annular zone 48 of the terminal surface of the deformable wall 41. The annular zone of each wall 42 which is external to the zone of contact is provided with grooves 49. One of these walls is provided with a mouthpiece 50 for connection with a device (not illustrated) loading the container with explosive charges, this mouthpiece being bored by a pipe 51 connecting the internal space of the container with a loading pipe of this system.

An explosive charge (not shown) is located as already known, substantially in the center of the container.

At the instant of the explosion, a gas bubble is created and grows. The cylindrical wall 41 which is elastically deformable is then pushed outwardly, the annular zone 47 of each wall 42, being no longer in contact with the annular wall 48 of the wall 41, and the grooves 49 provide for the momentary communication of the internal space of the container with the surrounding liquid medium. The water enclosed in this internal space is expelled through the grooves 49 during the expansion period of the gas bubble. During the following period the gas bubble begins to contract. At this instant, the deformable wall 41 moves back to its initial position while retracting and the annular zones 17 and 48 are again in contact, without any substantial interval therebetween, thereby preventing any inlet of water into the container and stopping the pulsations of the gas bubble. The rigid rods 43 located inside the deformable wall 41, prevent any excessive contraction of the latter.

The device according to the invention, while having a high efficiency, has furthermore the advantage of being of very simple design.

According to another embodiment of the invention, illustrated by FIG. 10, the container is constituted by a rigid wall 52 including an annular part, having for example the shape of a bottle, in association with an elastically deformable wall 53, these walls being preferably made of an acoustically transparent material. The wall 52 is perforated with apertures 54 over an annular zone. The resilient wall 53 surrounds the wall, fully covering this zone perforated with apertures and obturating the latter in its normal position.

The wall 52 is provided with a mouthpiece 55 for connection with a device not shown loading the container with ezplosive charges, this mouthpiece having an internal pipe 56 intended to connect the internal space of the container with the pipe feeding this device.

A rigid (for example metallic) belt 57 holds the resilient wall 53 in position.

When the explosive charge (not shown), located substantially in the center of the sphere explodes a gas bubble is created and grows. The annular wall 53 is then pushed back outwardly and moves apart from the rigid wall 52, thereby uncovering the apertures 54 through which the water inclosed in the internal wall of the container can escape.

During the following period, the gas bubble begins to contract. At this moment, the deformable wall 53 upon retraction, moves back to its initial position, obturating the apertures 54 again, thereby preventing any ingress of water from the surrounding medium into the container and thus stopping the pulsations of the gas bubble.

With each of the above-described embodiments it has been ascertained that the best results were obtained when the minimum diameter of the container was smaller than the diameter of the gas bubble which would freely be created in the considered liquid medium at the same depth of explosion, and with an identical charge.

Obviously many other embodiments of such a device, based on the same concept, might be devised without departing from the scope of the present invention.

It will be particularly advantageous to use for the container a material having the quality of a high "acoustical transparency."

Such a material must be so selected that the value of the product of its density by the velocity of propagation of the acoustical waves in this material is substantially equal or at least as close as possible to the value of the product of the density of the surrounding liquid medium by the velocity of propagation of the acoustical waves in this liquid medium.

Rubber and plastic material generally comply with this condition. It will therefore be of advantage to use them to build the container where the explosion takes place.

As the case may be, one may use these materials either in their flexible or resilient form (rubber) or in a rigid or semi-rigid form (plastic materials having a non-metallic reinforcement, or stratified materials, some sorts of rubber, etc. . . . ).

When the device for firing the explosive charge includes a circuit which is electrically closed through the body of water, it is necessary to provide means for electric connection between the body of water located inside the container and the body of water located outside this container.

What is claimed is:

1. Device for firing explosive charges, comprising a container wherein the explosion is to be carried out, said container being provided with a mouthpiece having an internal pipe for feeding the container with explosives from a surface installation, wherein said container comprises at least a closing and opening element formed by at least one deformable wall member of resilient material providing for the intermittent connection of the interior of said container with the surrounding liquid medium by deformation under the action of the pressure rise inside said container as a result of the explosion.

2. Device according to claim 1, wherein the container is a hollow cylinder provided with an aperture at each end and wherein the elements for closing and opening said container are constituted by two covers of resilient material, each of which is fastened over a part of its periphery to one of said ends, in position of closure of the corresponding aperture 3. Device for firing explosive charges, comprising a container wherein the explosion is to be carried out, said container being provided with a mouthpiece having an internal pipe for feeding the container with explosives from a surface installation, wherein said container is of a substantially spherical shape and comprises a closing and opening element made of a resilient material providing for the intermittent connection of the interior of said container with the surrounding liquid medium by deformation under the action of the pressure rise inside said container, as a result of the explosion, said element being constituted by a tubular extension of the sphere, the internal section of which is substantially circular in the vicinity of the sphere and becomes progressively elliptical toward its terminal part most remote from the sphere, said part having a flattened and widened shape.

4. Device for firing explosive charges, comprising a container constituted by two hemispherical elements of a strong and resilient material wherein the explosion is to be carried out, one of said elements being provided with a connecting mouthpiece including an internal pipe for feeding said container with explosives from a surface installation, each element having a diametral base provided with an annular flange of resilient material, projecting beyond said element over a certain width, said elements being applied against each other, so as to form a spherical container, by means of rigid binding rings which are held in position through circular ribs in diametral planes of said spherical container on the external wall thereof, the associated flanges providing for the intermittent connection of the interior of said container with the surrounding liquid medium, by deformation of said wall under the action of the pressure rise inside said container, as a result of the explosion.

5. Device for firing explosive charges comprising a container constituted by two hemispherical elements made of a strong resilient material wherein the explosion is to be carried out, one of said elements being provided with connecting mouthpiece including an internal pipe for feeding said container with explosives from a surface installation, each element having its circular diametral base provided with an annular flange of resilient material projecting beyond said element over a certain width, said elements being interconnected so as to form a spherical container and held in position by two hemispherical caps of rigid material which are provided with recesses and each surrounding one of said elements, each cap having its diametral circular base provided with an annular flange projecting beyond said flange of the hemispherical elements, said annular flanges of the caps being interconnected at some places outside the flanges of said elements, so as to provide some free space between the annular flanges of said caps, providing a free outlet from the annular flanges of said elements to the surrounding body of water, the associated annular flanges of said elements constituting opening and closing elements providing for the intermittent connection of the interior of said container with the surrounding liquid medium, by deformation of said wall under the action of the pressure rise inside said container, as a result of the explosion.

6. Device according to claim 5, wherein the annular flange of the hemispherical elements is interrupted at the places where said hemispherical caps are interconnected.

7. Device for firing explosive charges comprising a container constituted by two hemispherical elements made of a strong resilient material wherein the explosion is to be carried out, one of said elements being provided with a connecting mouthpiece including an internal pipe for feeding said container with explosives from a surface installation, each element being provided with a flange made of a rigid strong material projecting beyond said element over a certain width, said flanges being covered with a resilient material on their adjacent faces and being interconnected by resilient connecting means and constituting an opening and closing element providing for the intermittent connection of the interior of said container with the surrounding liquid medium, by deformation of said wall under the action of the pressure rise inside said container, as a result of the explosion.

8. Device for firing explosive charges comprising a container wherein the explosion is to be carried out, said container being constituted by a hollow cylinder of resilient material provided at each of its ends with a rigid circular wall at least an annular zone of which is applied in position of closure of said container against an annular zone of the surface of each end of said cylinder and being provided with a mouthpiece having an internal pipe for feeding the container with explosives from a surface installation, said cylinder in cooperation with each rigid circular wall providing for the intermittent connection of the interior of said container with the surrounding liquid medium, by deformation of said cylinder under the action of the pressure rise inside said container, as a result of the explosion.

9. Device according to claim 8, wherein said rigid circular wall projects outward beyond its zone in contact with said resilient cylinder and is provided with grooves located on its external annular zone.

10. Device according to claim 8, including two rigid walls interconnected by rigid rods located inside the space limited by a resilient cylinder.

11. Device for firing explosive charges, comprising a container wherein the explosion is to be carried out, said container being provided with a mouthpiece having an internal pipe for feeding the container with explosives from a surface installation, wherein said container, made of a rigid material, has a substantially cylindrical wall, is provided with a plurality of apertures throughout its cylindrical wall, and comprisses a closing and opening element constituted by an elastic belt covering and closing said apertures, said element providing for the intermittent connection of the interior of said container with the surrounding liquid medium, by its deformation under the action of the pressure rise inside said container, as a result of the explosion.

References Cited

UNITED STATES PATENTS

| | | |
|---|---|---|
| 3,260,327 | 7/1966 | McCollum. |
| 3,289,784 | 12/1966 | Cassand et al. |

BENJAMIN A. BORCHELT, *Primary Examiner.*

G. H. GLANZMAN, *Assistant Examiner.*